April 12, 1966 W. E. SIGNOR 3,245,635
PULL OUT DISPLAY DEVICE
Filed Oct. 24, 1962 2 Sheets-Sheet 1
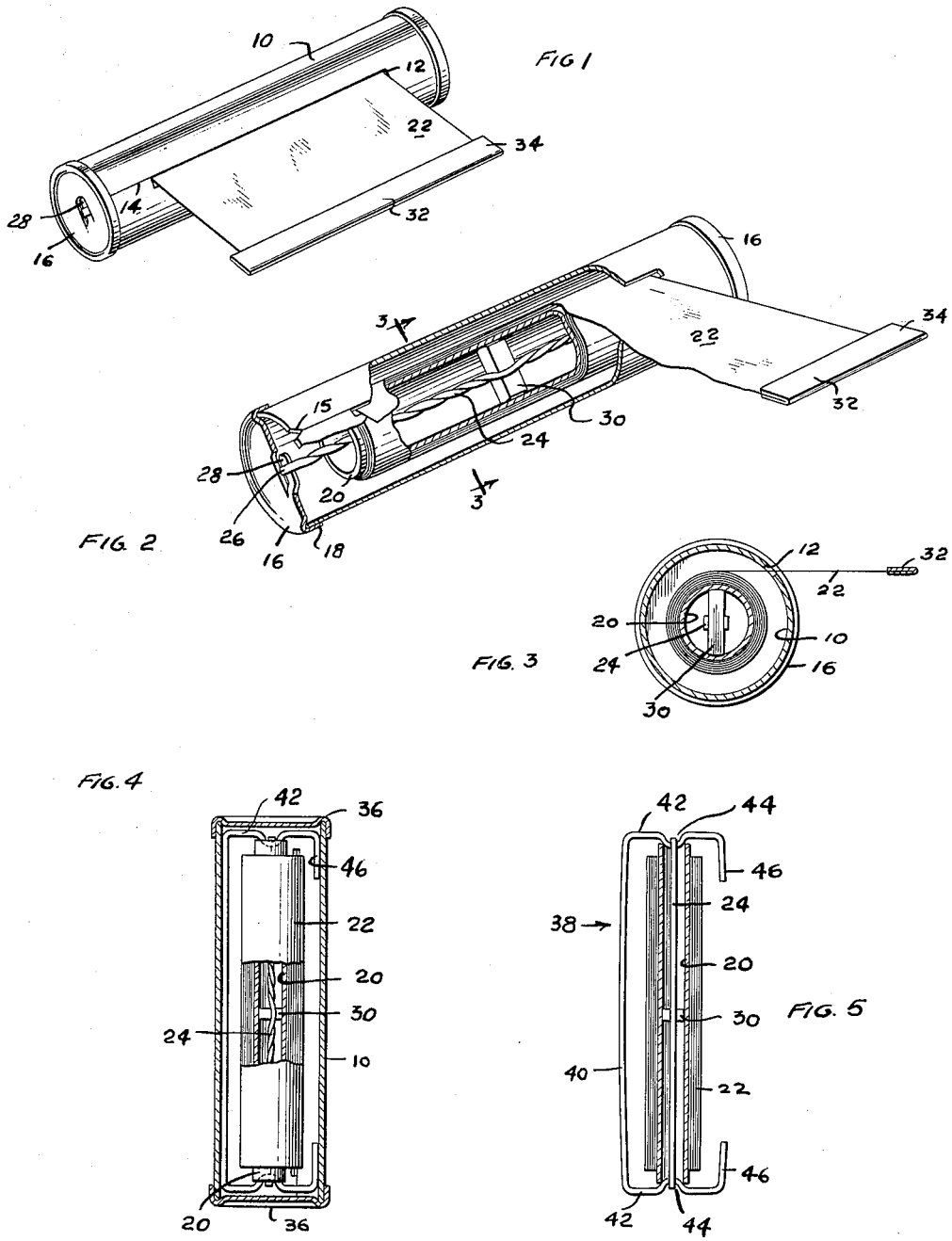
INVENTOR.
WILLIAM E. SIGNOR
BY
Pattison, Wright & Pattison
ATTORNEYS April 12, 1966  W. E. SIGNOR  3,245,635
PULL OUT DISPLAY DEVICE
Filed Oct. 24, 1962  2 Sheets-Sheet 2
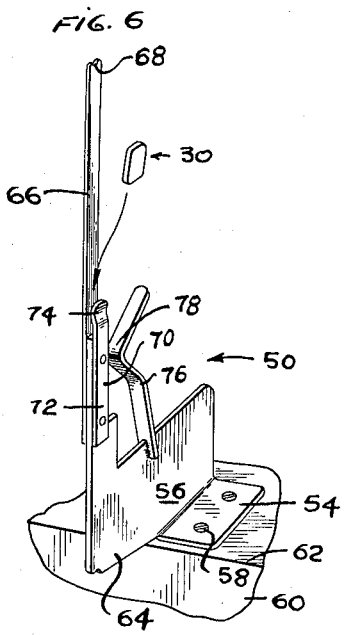
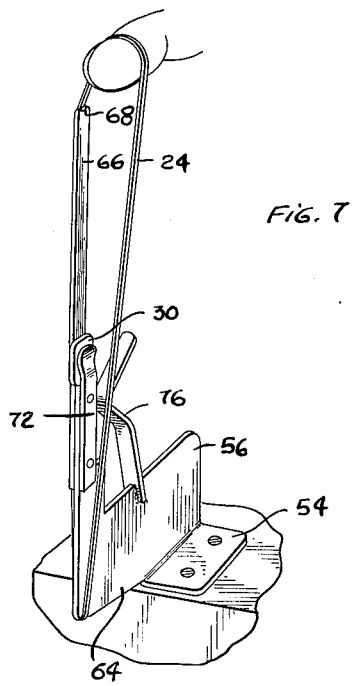
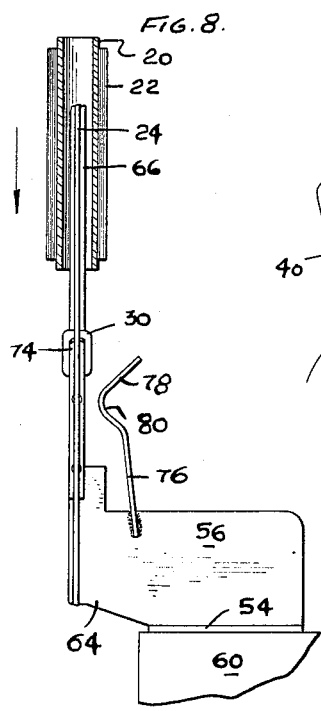
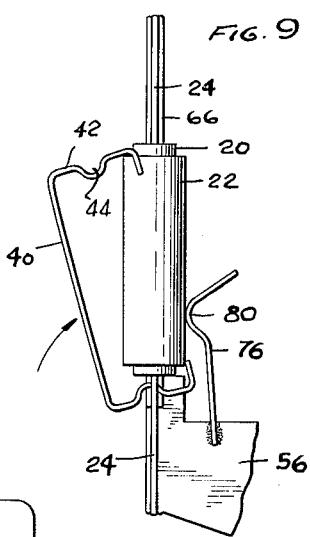
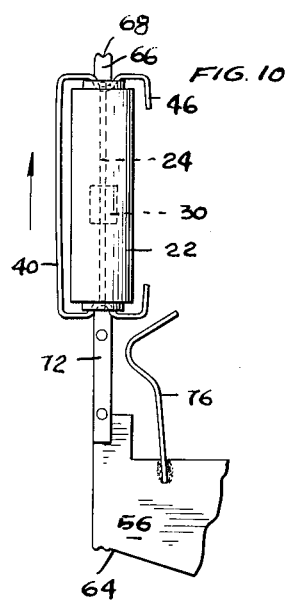
INVENTOR.
WILLIAM E. SIGNOR
BY
Pattison, Wright & Pattison
ATTORNEYS

3,245,635
PULL OUT DISPLAY DEVICE

William E. Signor, Laytonsville, Md., assignor, by mesne assignments, to Rolaview, Inc., a corporation of Pennsylvania
Filed Oct. 24, 1962, Ser. No. 232,829
3 Claims. (Cl. 242—107)

The present invention relates to new and useful improvements in display devices and more particularly and specifically to a unique, automatically retractable, pull-out display device.

The prior art contains numerous disclosures of display devices including a housed, reel mounted display sheet which may be pulled out or extracted from the housing for exhibition, and which include means for rewinding the display sheet into the housing. However, these prior art disclosures relate to structure which is either difficult, if not impossible, to manufacture by any reasonable or feasible methods or procedures, and devices assembled in accordance with prior art disclosures would be costly and impractical of commercial production.

It is, therefore, a general object of the present invention to provide a unique and improved retractable, pull-out display device which substantially overcomes or eliminates production problems inherent in prior art devices of like nature and purpose.

A principal object of this invention resides in the provision of an automaticaly retractable, pull-out display device which is capable of low cost, mass production to provide an attractive, functional and durable article of manufacture.

A further object of this invention is the provision of an inexpensive, yet durable, retractable display device which functions for a multiple of useful and advantageous purposes, such as for data storage, advertising display and the like.

Still additional objects and advantages of the present invention will become readily apparent to one skilled in the art when the following description and general statement are read in the light of the accompanying drawings.

The nature of the present invention may be stated in general terms as relating to an automatically retractable, pull-out display device which includes an elongated hollow housing having a slotted opening through a portion of the length thereof, an elongated tube within the housing having a rolled display thereon presenting a free end in projection through the slotted housing opening, means mounting said tube for rotation about its axis within said housing, and resilient means urging said tube in a direction of rotation so as to roll said display sheet thereon.

Referring now to the accompanying drawings in which like numerals designate similar parts throughout the several views:

FIG. 1 is a perspective pictorial illustration of the device constituting the present invention;

FIG. 2 is an enlarged view similar to FIG. 1 with fragments broken away and in partial section for clearer illustration;

FIG. 3 is a sectional view taken on line 3—3, FIG. 2;

FIG. 4 is a longitudinal section of a modified form of the present invention;

FIG. 5 is a partial section of the supporting bracket of the modified form;

FIG. 6 is a perspective pictorial view of a novel tool for manufacture of the inventive device in the first step of production;

FIG. 7 is the tool of FIG. 6 in the second step of production;

FIG. 8 is the tool of FIG. 6 in the third step of production;

FIG. 9 is the tool of FIG. 6 in the first additional step of production required for the modified inventive device;

FIG. 10 is the second additional step of the tool of FIG. 6 in production of the modified inventive device.

In the primary embodiment of the present invention, as illustrated in FIGS. 1 through 3 of the accompanying drawings, the pull-out display device consists of an elongated tubular housing 10 having a slotted opening 12 extending longitudinally through a central portion thereof, one end of which opens through a restricted slot 14 outwardly through one end of the housing which is provided at the entry of the slot thereinto with an enlarged tapered opening 15 formed by angularly cutting the wall of the housing into the line of the restricted slot.

The open ends of the housing 10 are closed by cap-like end closures 16 which are provided with depending marginal flange portions 18 which telescope over the wall of the housing to position the caps in end enclosing condition.

Located within the housing 10 is an elongated tube 20 upon which is secured and rolled an elongated sheet 22 on which is provided display indicia.

The internal tube 20 is axially positioned upon an elongated endless rubber band 24, the end loops 26 of which are engaged over an offset hook formation 28 formed in each of the end caps 16 of the housing. A wedge element 30 is positioned centrally within the interior of tube 20 in tight fitting condition transversely of the walls thereof, and the wedge 30 projects between and separates the two leg portions of the endless rubber band extending longitudinally through the housing.

The free end of the display sheet 22 wound on the internal tube 20 is extended in projection outwardly through the elongated slot 12 in the housing and a tab element 32 is secured longitudinally of the free transverse edge to project, as at 34, for a distance beyond the longitudinal side edges, said tab being of an overall length greater than the longitudinal length of the slotted opening 12 in the housing 10.

As is best seen in FIG. 2 of the drawings, the withdrawal of the display sheet 22 through the slotted opening in the housing 10 will wind the two leg portions of the rubber band on each side of the wedge element 30 under tension, twisting the two legs thereof about each other so as to place the tube under rotative bias tending to withdraw the sheet back into the housing in a wound condition on the cylinder. Thus, automatic retraction of the display sheet is accomplished by the rotational tensions built up in the device by the physical withdrawal of the sheet through the slotted opening in housing 10. Upon release the free end of the sheet will be retracted to a point where the extended end portions of the tab 34 engage the outer housing wall preventing retraction beyond such contact.

In the modified form of the present invention as illustrated in FIGS. 4 and 5, which would be the preferred form for mass production purposes, the display device consists of the same elongated tubular housing 10 having the slotted opening 12 therein which opens through a restricted slot 14 through the end of the housing wall. The ends of the housing are each closed by a cap member 36 which has a marginal pendent wall telescoping over the end section of the housing to locate and hold the cap in end closing position. Within the housing there is located a wire or metallic bracket or frame 38 which consists of an elongated leg 40 having perpendicular end extensions 42 each of which has a depressed groove 44 intermediate the length thereof. Each end extension 42 of the frame is provided with a short right angular projection 46 lying parallel to the elongated leg 40 thereof. In this embodiment the internal tube 20 is positioned longitudinally between the end extensions 42 of the bracket and the end loops of the rubber band 24 are engaged over the perpendicular end portions 42 of the bracket to lie within the depressions 44 therein. The wedge 30 within the tube 20, in its projection between the leg sections of the rubber band 24, serves to retain and position the tube within the bracket.

The longitudinal and transverse dimensions of the different elements of the bracket 38 are such that the bracket may be slidably inserted through one open end of the housing 10 positioning the leg 40 in frictional engagement with the internal wall of the housing, while at the same time positioning the offset portions 46 parallel to the leg 40 under tensional engagement with the wall of the housing diametrically opposite the leg 40. Thus, the bracket is tightly positioned within the housing supporting the tube 20 centrally therein to permit the display sheet 22 thereon to be projected outwardly through the slotted opening 12 and withdrawn and retracted relative to the housing in the same manner as hereinbefore described.

The production tool and step by step method of its use in the assembly of a display device of the type shown in FIGS. 4 and 5 of the drawings is illustrated in FIGS. 6 through 10 of the accompanying drawings. The tool, generally designated at 50, consists of an L-shaped bracket formed of flat metal having a perpendicular flange element 54 formed integrally with the foot portion 56 of the bracket which may be secured by screws 58 or the like into the top surface of a work bench 60 adjacent one edge 62 thereof to locate the heel portion 64 of the L-shaped tool in projection outwardly from the edge of the bench. The vertical leg 66 of the L-shaped tool is provided on its extreme upper end with a notched depression 68 and intermediate one flat side thereof with a flat spring 70 having one end secured to the leg and an upwardly disposed end resiliently movable toward and away from the adjacent surface of the vertical leg. A second flat spring element 76 is secured to top edge of the foot portion 56 of the L-shaped bracket to project upwardly therefrom toward the inside face of the vertical leg 66 of the L-shaped bracket perpendicular to the face of the leg to which the flat spring 70 is secured. This second spring element has a curvilinear end 78 placing an arcuate portion 80 thereof in spaced relationship to the vertical leg 66.

In assembly of the device of FIGS. 4 and 5 utilizing the tool 50, a wedge element 30 is positioned between the free end of spring 70 and the vertical leg of the tool. Then an endless rubber band 24 is positioned longitudinally of the vertical leg 66 of the L-shaped tool and is looped over the upper and lower extremities thereof to position the same on the tool with the parallel legs or sections of the band lying in close adjacency to the opposed faces of the vertical leg of the tool, one section of the band overlying the flat spring 70 and the wedge element 30 previously positioned between the free end 74 of the spring and the adjacent face of the vertical leg 66. Thereafter, the tube 20, with the display sheet 22 secured at one end and wound thereon is vertically telescoped downwardly over the vertical leg 66 of the tool and over the wedge 30 which, upon depression of the tube or cylinder 20 beyond the point of wedge contact of the lower end of the tube causes the wedge to be forced into the tube to a central position longitudinally thereof, while the second flat spring 76 engages the external wall of the tube to retain the tube in substantially fixed position on the vertical leg of the tool. Thereafter, the metallic bracket or frame 78 is positioned adjacent the tube and the projections 46 thereof are slidably moved between one longitudinal leg section of the rubber band and the adjacent face of the vertical leg of the tool to position the end depressions 44 in the perpendicular extensions 42 of the bracket immediately above and below the upper and lower ends, respectively, of the tube 22. When the bracket 28 has been positioned as described, the ends of the rubber band are freed from their looped positions over the remote ends of the vertical leg of the tool to permit them to move to positions of engagement with the depressions 44 in the end extensions 42 of the frame, thereby mounting the tube 20 within the frame in condition to be slidably inserted with the housing 10. The tube and frame are then vertically removed from the vertical leg of the tool 50.

The assembled unit thus removed from the tool 50 is positioned adjacent that open end of the housing through which the restricted slot 14 opens and one longitudinal edge of the display sheet 22 is fed into the chamfered or tapered open portion 15 in the end of the housing to permit the sheet element to be slidably moved through the restricted slot 14 into the elongated slot 12 as the wire bracket or frame is slidably, frictionally telescoped longitudinally into position within the housing. Thereafter, the end caps are positioned on the tubular housing and the display device has been completely assembled.

It is fully contemplated that the housing may be made in any of a variety of shapes or forms (i.e., bottle, bread loaf, cigar, cigarette package, etc.) adapted to a particular advertising purpose. It is also anticipated that various materials such as plastics, paperboards and the like may be utilized in fabrication of the housing and reel tube.

Having thus described my novel and unique display device, the method for its assembly, and the novel tool utilized in practice of the assembly method, what I desire to claim is:

1. A display device comprising an elongated cylindrical housing having a slotted opening longitudinally of an intermediate portion thereof, an elongated wire frame slidably engaged in said housing, an elongated tube in said housing positioned within said frame, an endless rubber band secured between remote end portions of the frame and extending coaxially through said elongated tube, a wedge element fixed transversely within said tube and projecting between the separate leg portions of the endless rubber band, and a display sheet wound on said tube presenting a free end in extended projection through the slotted opening in said housing.

2. A display device comprising a cylindrical housing having a slotted opening longitudinally of an intermediate portion thereof, an elongated frame removably positioned in said housing, an elongated tube within said housing and said frame, an endless rubber band extending through said tube and having the remote end loops thereof anchored respectively to the remote ends of said frame, a wedge element fixed transversely within said tube between the legs of the endless rubber band, and a display sheet wound on said tube and presenting a free end thereof in projection through the slotted opening in said housing.

3. A display device as defined in claim 1 wherein said cylindrical housing is provided with removable end caps engaged thereon.

References Cited by the Examiner

UNITED STATES PATENTS

| | | | |
|---|---|---|---|
| 202,281 | 4/1878 | Mettam | 46—84 |
| 551,331 | 12/1895 | Gray | 242—107 |
| 910,419 | 1/1909 | Schell | 242—107 |
| 1,436,241 | 11/1922 | Davis | 242—107 |
| 1,922,716 | 8/1933 | Robinett | 242—1 |
| 1,944,395 | 1/1934 | Bell | 242—107 |
| 2,025,920 | 12/1935 | Webber | 242—1 |
| 2,351,822 | 6/1944 | Lauterbach | 40—85 |
| 2,503,101 | 4/1950 | Drury | 242—107 X |
| 2,669,014 | 2/1954 | Neilsen | 269—52 |
| 2,827,689 | 3/1958 | Shoffner et al. | 269—254 |

MERVIN STEIN, *Primary Examiner.*